United States Patent [19]

Copping

[11] 4,076,026
[45] Feb. 28, 1978

[54] SOLAR HEATER

[76] Inventor: Bruce G. Copping, 310 Burning Tree Drive, Naples, Fla. 33940

[21] Appl. No.: 731,221

[22] Filed: Oct. 12, 1976

[51] Int. Cl.² .............................................. F24J 3/02
[52] U.S. Cl. .................................... 126/271; 237/1 A
[58] Field of Search ................ 126/270, 271; 237/1 A

[56] References Cited
U.S. PATENT DOCUMENTS

| | | | |
|---|---|---|---|
| 1,753,227 | 4/1930 | Wheeler et al. | 126/271 |
| 2,208,789 | 7/1940 | Cally | 126/271; 237/1 A |
| 3,227,153 | 1/1966 | Godel et al. | 126/271 |
| 3,239,000 | 3/1966 | Meagher | 126/271 |
| 3,859,980 | 1/1975 | Crawford | 126/271 |

Primary Examiner—Kenneth W. Sprague
Attorney, Agent, or Firm—Oldham & Oldham

[57] ABSTRACT

A solar heater for a liquid has a panel-like unit including a plurality of tubes lying in and defining a plane which panel unit includes an inlet header, an outlet header, and a connector header. A set of a plurality of relatively small diameter tubes connecting the inlet header to a length of the connector header, while a second set of relatively small diameter tubes connect another length of the connector header to the outlet header tube, and support means support the panel unit by slidably engaging the tubes of the two different sets of tubes to compensate for expansion and contraction of components of the panel unit.

4 Claims, 4 Drawing Figures

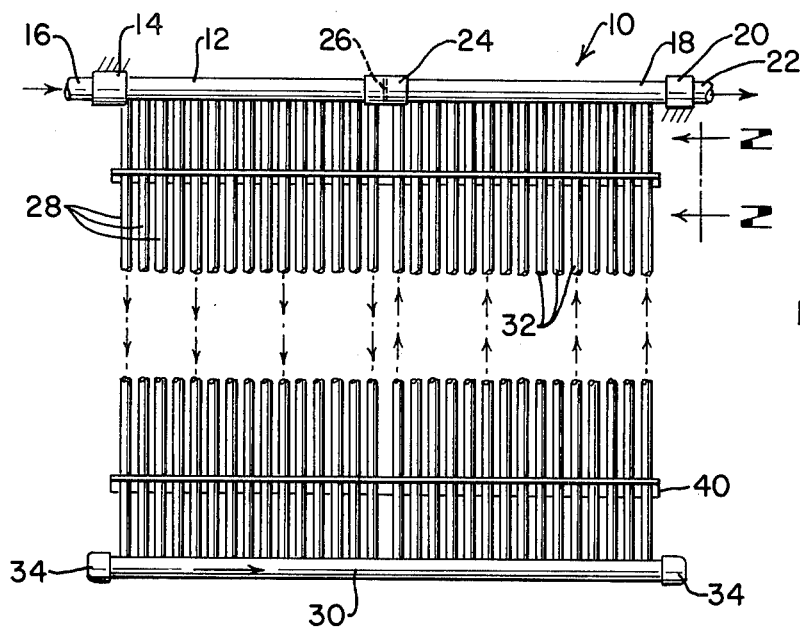
FIG-1
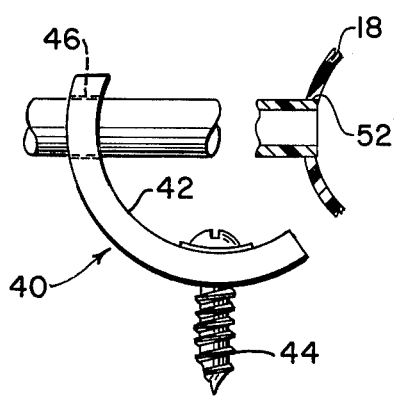
FIG-2
FIG-3
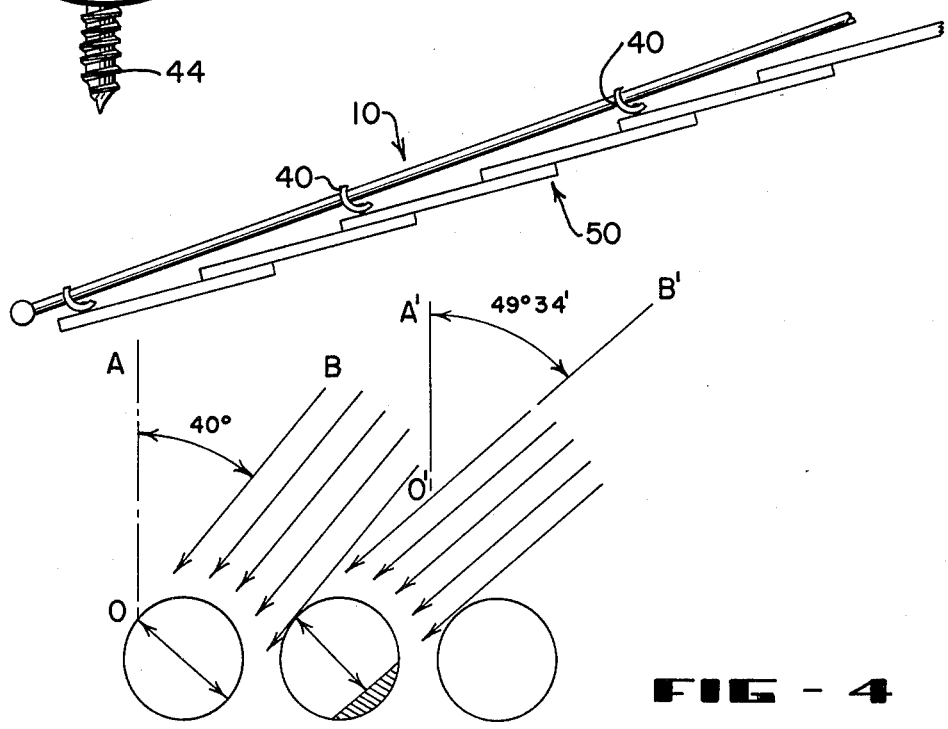
FIG-4

SOLAR HEATER

Heretofore there have been many different types of solar heaters provided and currently appreciable activity exists in the solar heating field due to the low cost of solar energy and its ready availability in many portions of the world. Efforts have been made heretofore to provide relatively inexpensive but sturdy, effective and efficient solar heater unit. However, it is difficult to provide solar heating apparatus having a good service life and which is easy to install and maintain, and yet will provide satisfactory solar heating action.

The general object of the present invention is to provide novel and improved solar heating apparatus having a plurality of tubes lying in and defining a plane and including individual inlet and outlet headers, and a common connector header with different sets of relatively small diameter tubes connecting the inlet header to the connector header, and the connector header to the outlet header.

Another object of the invention is to provide a solar heater unit that can be made from plastic piping and tubing materials, and wherein solvent produced welded joints can be readily and inexpensively provided in assembling the unit.

Another object of the invention is to provide header tubes in a solar heating panel wherein small diameter connector tubes can be used for the actual solar heat absorbing action, and wherein these tubes are spaced sufficiently from each other to provide an effective heat receiving surface under substantially all normal variations in the angular relationship of the sun's rays to the individual solar panel heating tubes with changes in the sun's position.

Another object of the invention is to provide a controlled, efficient path for flow of liquid through a panel of tubes for solar heating while the liquid is within the tubes of the panel.

Another object of the invention is to provide a novel and improved mounting for a solar heating panel, which panel lies in and defines a plane, and wherein the positioning means permit a ready expansion and contraction of the solar heating panel in relation to one fixed component of the panel.

The foregoing and other objects and advantages of the invention will be made more apparent as the specification proceeds.

Reference now is directed to the accompanying drawings wherein:

FIG. 1 is a plan view, partially broken away, of a panel unit embodying the principles of the invention;

FIG. 2 is an enlarged fragmentary side elevation of the apparatus of FIG. 1, taken on line 2—2 of FIG. 1;

FIG. 3 is a side view of the unit as anchored to a roof; and

FIG. 4 is an enlarged diagrammatic view of the heat transfer tubes of the panel of the invention and the relationship of the angularity of sun's rays in relation thereto.

When referring to corresponding members shown in the drawings and referred to in the specification, corresponding numerals are used to facilitate comparison therebetween.

SUBJECT MATTER OF INVENTION

The solar heater of the invention, as one embodiment thereof, comprises a panel unit including an inlet header, an outlet header, a connector header, and one set of a plurality of relatively small diameter tubes connecting the inlet header to one end portion of the connector header, a second set of a plurality of relatively small diameter tubes connecting the other end portion of the connector header to the outlet header for flow of liquid from the inlet header tube through the one set of tubes to the connector header and back from the other end portion of the connector header through the second set of tubes to the outlet header. Support means are provided for the panel unit and it includes members slidably engaging the individual tubes of the sets of tubes to permit relative axial movement of the tubes in relation to the support members.

The solar heater of the invention is indicated as a whole by the numeral 10. Such solar heater normally comprises a panel unit which includes a plurality of tubes lying in and defining a plane for flow of liquid therethrough for solar heating action. Specifically, an inlet header 12 is provided and it normally engages with an inlet coupling 14 that can be and usually is fixedly positioned and suitably connects to an inlet tube 16. The panel unit of the invention also includes an outlet header 18, which header or tube is normally secured to an outlet coupling that in turn has an outlet tube 22 connecting thereto and extending therefrom. These couplings 14 and 20 preferably are used to support or position one end of the solar heater of the invention fixedly to permit axial expansion and contraction of the remainder of the solar heater in relation to these two fixed parts of the heater unit.

Preferably, the inlet header and outlet headers are secured together by a coupling 24 that positions these header tubes 12 and 18 in alignment. To prevent flow of liquid from the one header directly to the other, a suitable disc 26 is positioned within the coupling 24 and it has the ends of the header 12 and 18 bearing thereon and sealed in relation thereto to prevent liquid flow directly through the coupling from the one header to the other.

Flow of liquid through the apparatus of the invention for solar heating action is provided as by a set of relatively small diameter heating tubes 28 that are suitably welded or bonded to the inlet header tube 12, at spaced portions thereof, and where such tubes of the one set of tubes 28 extend to and connect to longitudinally spaced portions of one end part of a connector header 30, forming a part of the apparatus. This connector header normally is twice as long as the individual headers 12 and 18 that preferably are of equal lengths so that liquid flowing from the inlet header will flow through the tubes of the set of tubes 28 to the connector header and through such header axially from one end portion thereof to the other. A second set of tubes 32, usually of the same number and same size and composition as the tubes of the set of tubes 28 connects the connector header back to the outlet header. The connector header 30 is sealed at its ends as by conventional caps 34. Preferably the area of the different header tubes in the apparatus is calculated out to approximate the total areas of the tubes of the set of tubes 28, for example, and thus equal diameters can be provided for the headers, 12, 18 and 30, substantially equal to the total diameter of the set of tubes supplying liquid thereto or receiving liquid therefrom to facilitate orderly flow of liquid to and through the solar heating apparatus of the invention.

Preferably the inlet and outlet pipes or couplings of the solar heater panel unit are fixedly positioned to facilitate flow of liquid to and from the panel unit. Then to provide for expansion and contraction of the unit, support members 40, indicated in FIG. 2 of the drawings, are present. These support members 40 preferably comprise an elongated, arcuate in section, plastic or metal support bar 42. The lower end of this support bar 42 is secured to the associated support structure as by screws 44. The individual tubes of the sets of tubes 28 or 32 are slidably received in slots or holes 46 formed in upper portions of the support bar 42 to permit relative movement therebetween. Furthermore, the contour and composition of the support bar 42 is such as to provide slight flexibility in the mounting of these individual tubes.

The panel unit 10 of the invention is shown secured to a roof construction 50 by a plurality of the support members 40 engaging longitudinally spaced portions of the sets of tubes of the panel unit. This operatively positions the panel unit fixedly on a support structure for exposure to the sun's rays.

In making the units of the invention, preferably the tubes of the sets of tubes 28 and 32 are made from black plastic material, such as a polyvinyl chloride that has been compounded to be resistant to ultra violet light and is a commercially available product. These sets of tubes likewise preferably have the end header members thereof made from the same polyvinyl chloride material and the small tubes are usually solvent welded to the headers by applying a small amount of solvent to the outer surface of the tube ends of the sets of tubes 28 and 32 and a small amount of solvent to the hole formed in the wall of the header tube with a typical welded joint being indicated at 52 in FIG. 2.

By forming the tubes 28 of, for example, one-half inch O.D. pipe of thin walled construction, and by placing these pipes one-eighth inch apart, as indicated in FIG. 4, then these tubes of the individual sets of tubes will have good exposure to the sun's rays. Thus, as long as the sun's rays are falling perpendicularly to the horizontal as indicated by the line OA in FIG. 4 the full 180° peripheral extent of the tube is receiving the sun's rays. This continues until the sun is at an angle of 40° to the vertical as indicated by the line OB of FIG. 4. Such full exposure of the tubes to the sun's rays naturally will occur completely through the range of exposure of from 0° to 40° angle of the rays with the vertical. When these rays reach an angle of 49° 34' to the vertical, as indicated by the lines A'O' and O'B', even then a very effective exposure of the tube to the sun's rays is provided and approximately 87.5% of the periphery and effective diameter of the tubes is exposed to the sun's rays. Such maximum angle of the sun's rays would exist in southern Florida at noon on Dec. 21 and be better than that for the remainder of the year. But this shows that such particular relationship and sizing of the tubes is a very efficient construction. The figures referred to re FIG. 4 are obtained when the solar panel heating unit 10 is laid flat with the tubes running in an east to west direction.

Naturally the walls of the inlet, connector and outlet headers may be thicker than the walls of the small diameter tubes since primarily heat exchange action takes place in the small diameter tubes.

The solar heating unit of the invention is particularly useful in heating water for swimming pools. Any suitable pump means can be associated with the solar heating unit to pump water through the same at such a flow rate as to raise its temperature about 3° to 4° when in the unit. For example, if the ambient temperature is 90°, and the pool water temperature is 80°, the water can be raised to 84°. Normally the tube and the water in it is at lower than ambient temperature and naturally will not lose any heat to the atmosphere so that the cooler the tube is the more heat will go into it and the water contained therein, while flowing through the unit of the invention. A relatively high ratio of wetted surface is provided by the small diameter tubing of the invention, and sufficient turbulence is provided in the water as it flows through the solar heating panel to aid in getting effective heat transfer to the water being processed.

When the ambient temperature is at a lower temperature than the water, for example, at 50°, then there is some loss of heat from the pool water at 80° flowing through the solar heating unit of the invention. However, any such heat loss is overcome by the heat energy absorbed by the black solar transfer piping used and such heat is picked up by the pool water being processed to maintain its temperature at 80° or above. Naturally, the actual temperature of a body of water being processed would depend upon the size and number of the different solar heating panel units of the invention being used to process a given volume of water, and likewise, the velocity of the water being pumped through the solar heating unit.

While the use of plastic for production of the tubes and headers of the solar panel has been described, in some instances it may be preferred to use metallic tubes and headers soldered or otherwise secured together. Also, the barrier disc 26 may be carried in or secured to just one of the headers 12 and 18, if desired.

These new units of the invention have proven effective in service and can be attached to any desired support to be exposed to the sun's rays for the solar heating action desired. Thus, a sturdy, low cost, efficient solar heating unit has been provided by the invention.

While one complete embodiment of the invention has been disclosed herein, it will be appreciated that modification of this particular embodiment of the invention may be resorted to without departing from the scope of the invention.

What is claimed is:

1. A solar heater for a liquid and comprising a panel unit including a plurality of tubes lying in and defining a plane, said panel unit comprising an inlet header tube, an outlet header tube, a coupling securing said inlet and outlet header tubes together and in alignment, seal means associated with said coupling to prevent direct flow from said inlet header to said outlet header, a connector header, one set of a plurality of relatively small diameter tubes connecting said inlet header to spaced areas of one end portion of said connector header, a second set of a plurality of relatively small diameter tubes connecting spaced areas of the other end portion of said connector header to said outlet header tube; and support means for said panel unit comprising members slidably engaging said sets of tubes, said members comprising flexible anchor strips extending the width of said panel and apertured to engage all of said tubes of said sets of tubes, a portion of said strip extending down from said tubes to be anchored to a support structure by anchor means, inlet and outlet tubes connected to said inlet and outlet headers to retain such tubes and headers in substantially fixed positions and permit longitudinal movement of said tubes of said sets of tubes and of said connector header in relation to said anchor strips to said inlet and outlet tubes.

2. A solar heater for a liquid and comprising a panel unit including a plurality of tubes lying in and defining a plane, said panel unit comprising an inlet header, an outlet header, a connector header, one set of a plurality of relatively small diameter tubes connecting said inlet header to one end portion of said connector header, a second set of a plurality of relatively small diameter tubes connecting the other end portion of said connector header to said outlet header for flow of liquid from said inlet header through said one set of tubes to said connector header, and from it to said outlet header through said second set of tubes, and support means for said panel unit comprising a pair of flexible anchor members extending transversely of said sets of tubes at longitudinally spaced portions of said tubes slidably engaging said sets of tubes for support and positioning of the solar heater.

3. A solar heater as in claim 1 and including inlet and outlet tubes connected respectively to said inlet and outlet headers to retain such tubes and headers in substantially fixed positions and permit longitudinal movement of said tubes of said sets of tubes and of said connector header in relation to said support means.

4. A solar heater as in claim 2 where said inlet and outlet headers are aligned and have adjacent ends, a seal disc member is positioned by and between the adjacent ends of said inlet and outlet headers, and a coupling secures the adjacent ends of said inlet and outlet headers together and aids in positioning said seal member.

* * * * *